(No Model.) 2 Sheets—Sheet 1.
H. B. COBB.
SUBTERRANEAN LINE OF ELECTRIC WIRES.
No. 288,311. Patented Nov. 13, 1883.
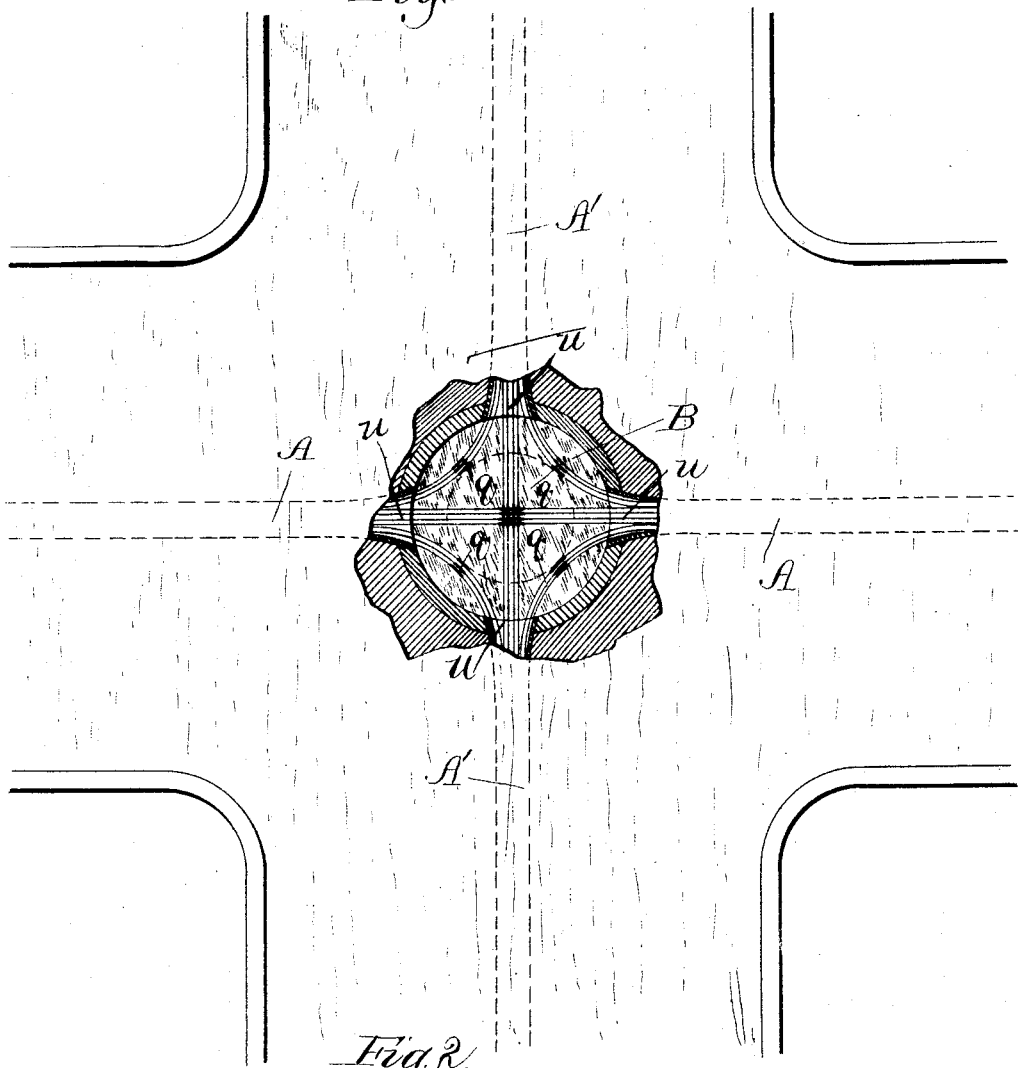
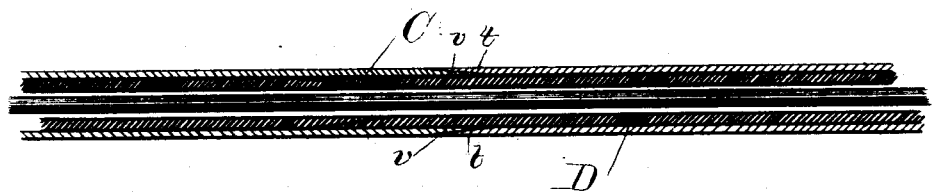

(No Model.) 2 Sheets—Sheet 2.

H. B. COBB.
SUBTERRANEAN LINE OF ELECTRIC WIRES.

No. 288,311. Patented Nov. 13, 1883.

Witnesses:
Chas. E. Gaylord.
R. H. Dyrenforth.

Inventor:
Henry B. Cobb.
by P. C. Dyrenforth,
his Attorney.

UNITED STATES PATENT OFFICE.

HENRY B. COBB, OF WILMINGTON, DELAWARE.

SUBTERRANEAN LINE OF ELECTRIC WIRES.

SPECIFICATION forming part of Letters Patent No. 288,811, dated November 13, 1883.

Application filed June 1, 1883. (No model.)

*To all whom it may concern:*

Be it known that I, HENRY B. COBB, a citizen of the United States, residing at Wilmington, in the county of New Castle and State of Delaware, have invented a new and Improved System of Laying Subterranean Lines of Electric Wires; and I hereby declare the following to be a full, clear, and exact description of the same.

My invention relates to the class of subterranean systems of electric conduiting-wires wherein the pernicious effects of induction are overcome by providing a metallic conduit to contain the insulated wires for the passage of electric currents, and by means of which, in consequence of its immediate contact with the ground, the inductive current is carried to earth.

The system recently patented by James T. Goodfellow has been found to answer satisfactorily in overcoming the effects of the inductive current when laid with care; but there is an almost insurmountable difficulty in the matter of laying the insulated line-wire, which necessarily has its insulating medium formed of a soft substance to permit of its being wound around a reel, and is subject, even with the greatest care, to abrasion while it is being drawn through the conduit, thus exposing the wire. Besides, there are manifold details of mechanism which must be used in connection with the system above referred to, which essentially make it intricate and unnecessarily expensive.

It is my object to provide a system of laying subterranean lines of electric wires in which the difficulties referred to shall be entirely overcome; and to this end my invention consists in providing a metallic tube or series of metallic tubes within a metallic conduit, each with a tube of an insulating substance inserted within it and inclosing the line-wire.

My invention consists, further, in certain details of construction and combinations of parts, all as hereinafter more fully set forth.

Figure 4:
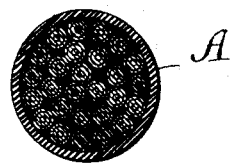
Figure 5:
Figure 6:
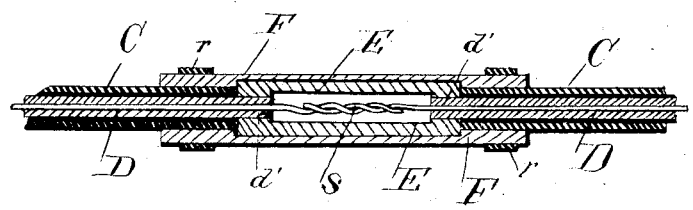
Figure 7:
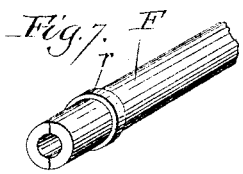

In the drawings, Figure 1 is a plan view of my system, viewed in part through the opening leading to a man-hole, and showing by dotted lines the conduits lying under the ground along intersecting streets; Fig. 2, a central longitudinal section of the principal feature of my invention, showing the manner of joining the sections of the outside metallic tube and of the insulating-tube with the line-wire in its position; Fig. 3, a central longitudinal section of parts of two lengths of the insulating-tube detached; Fig. 4, a transverse section of a conduit filled with metallic tubes containing the insulating-tubes and line-wires; Fig. 5, a longitudinal section of the same; Fig. 6, a longitudinal section of the device inside a man-hole, showing the arrangement provided to permit easy access to the different parts; and Fig. 7, a perspective view of a detail.

A and A' are metallic conduits, preferably of cylindrical form, (although they may be of any other form,) made in sections of any desired length, to be connected together in the process of laying by means of suitable coupling-joints.

B is a man-hole located at the center of two intersecting streets. A similar man-hole may be provided wherever the streets intersect, and the conduit reaches from one such man-hole to another, but does not extend across any of them. Each conduit is formed into a funnel shape at the ends where it meets a man-hole, as shown at *u*.

To lay the wires by my system entrance is made into the man-hole, when one section of the metallic tube C, which is always made of a length that will permit it to be handled within the dimensions of the said man-hole, is slipped into the conduit in the desired direction. The operator then takes another such tube and inserts the end thereof which is tapered on its outer surface, as shown at *v* in Fig. 2, into that of the first named, which is made correspondingly tapering on its inner surface near the end, as shown at *t*, to receive it, and slides them along within the conduit sufficiently far to permit the performance of a like operation with another length. As the ends of two lengths are thus connected by a slip-joint, they may, if desired, be cemented together. This operation may be continued until the desired length of tubing has been laid. Then follows the laying of the insulating-tube D. This tube is formed of an insulating substance—preferably, to secure proper hardness, of vulcanite—and, like the metallic tube, is made in lengths corresponding with those of the metallic tubes, but sufficiently smaller in diameter to permit them to be passed through the latter. The method of laying the insulator is exactly the same as that of laying the metallic tubes—that is to say, of two lengths tapered on the outer surface toward one end, as shown at $v'$, and on the inner surface toward the other, as shown at $t'$, one is inserted into the other, when they are pushed along, and the operation repeated until the desired length has been laid. The line-wire is then drawn through in the old way, if desired; but it is preferred, owing to the greater ease of its accomplishment, to push it through in the same direction that the tubes are passed through in laying them. The hard quality of the insulator will prevent injury to it by friction against the wire, and the pushing can readily be effected with a suitable contrivance, by means of which the wire is unwound from a reel in the man-hole and pushed between rollers, operated by a crank, along the interior of the insulator, whereby at the same time any kinks in the wire are removed. Reference to Figs. 1 and 6 of the drawings will show the arrangement of the tubes within the man-hole. As before stated, the conduit does not extend across but terminates with a funnel-shaped extremity at the edge of the man-hole. The tubes containing the wires are made to extend into the man-hole to a point two or more inches short of its center, a like distance being left on the other side of the said center, where the tubes are directed into the continuation of the conduit. The object of discontinuing the conduit at its entrance to the man-hole, as described, is to permit ready access to any tube without disturbing the others, and to allow the different tubes to intersect each other within the man-holes, and to be kept from contiguity with each other, if desired, either by bending the tubes or by inserting suitable wedges between them. The arrangement of the tubes and wires within the man-hole, as indicated in Fig. 1 of the drawings, and clearly shown in Fig. 6, is to permit easy access to the wire whenever occasion demands without the necessity of destroying or even injuring the metallic tube C or the insulating-tube D. The following is a clear description of the said arrangement: As hereinbefore stated, the metallic tube C and insulating-tubes D extend into each man-hole to a point near its center, and continue from a point equally distant on the other side of the said center. A space sufficient for the handling of the wire is thus provided, and the latter can be laid in sections extending between the man-holes and joined together within the latter, as shown at $s$ in Fig. 6, or in any other suitable manner.

On close inspection of Fig. 6 of the drawings it will be seen that the tubes D extend inward toward the center of the man-hole somewhat farther than the tubes C, thus leaving projections $d'$, around which the insulating-sleeve E fits. This sleeve is preferably formed, like the insulating-tube D, of vulcanite, and may, if desired, be formed, like the metallic sleeve F, hereinafter described, in two longitudinal sections held together to form a cylinder around the projections $d'$ by means of rings slipped over it and resting in notches formed around the exterior, near the ends thereof. It is not, however, deemed of great importance that the construction of the sleeve E should be as just described; but it may be formed in one piece, when its destruction in seeking access to the wire will be inevitable, but of little consequence, owing to the slight expense necessary to replace it.

F is a metallic sleeve formed in two sections, and joined together around the projecting ends of the tubes C in the man-holes by means of rings $r$. This sleeve F is recessed on its inner surface sufficient to admit the sleeve E, which is likewise recessed on its inner surface to afford an enlarged space, made necessary to accommodate the twisted wire and to afford more space in which to manipulate the latter.

By the construction just described, whenever it is necessary to have access to any part of the system, the sleeve F is removed by slipping off the rings $r$, and thus separating its sections, when the sleeve E, if similarly formed, may be removed in the same way, or broken away, if formed as shown in the drawings. Either of the three features—the metallic tube, the insulating-tube, or the wire—may be removed in any desired length on merely separating the sections of wire, and the removal can be accomplished without otherwise disturbing any other than the part to be removed. The curved sections $q$ (shown within the man-hole) are intended to represent the manner of changing the course of any wire, with its surrounding tubes, from one street in either direction along an intersecting one. It is to permit the gradual bend in the wire-containing tubes, by which they are directed from one conduit, A, along an intersecting one, A', that the conduits are made flaring at their extremities where they meet the man-holes; and another reason is given in this connection for discontinuing the conduits at the man-holes—viz., to permit the above-described change of course of the tubes and wires. If any length, whether of the metallic or insulating tubing or wire, requires removal, it is only necessary to release it from its connections at two man-holes bounding the intermediate required length, and, on disconnecting the wire, to draw it out. The metallic tubes C lie within the conduit, preferably in close contact with each other, in order that the induction-current may pass unobstructed from them to the conduit, and thence to earth. Suitable T branches are provided along the conduit, to permit connection to be made for electric-light or telephone wires with houses. If desired, a conduit may be provided with any number of tubes C at the time the said conduit is laid, whereby it will only be necessary to insert insulating-tubes and wires as they may be required, and these tubes may be of different sizes to accommodate wires for the various electrical purposes.

What I claim as new, and desire to secure by Letters Patent, is—

1. In an underground system of electric conducting-wires, the combination of the following elements, viz: a conduit of metal, one or more metallic tubes, C, inclosed within the said conduit and in electrical contact with it, and a tube, D, of insulating material, inserted through each of the said tubes C, through the interiors of which insulating-tubes the separate wires are passed, substantially as described.

2. In combination with the tube C, of metal, formed in short lengths coupled together, the tube D, formed of an insulating substance in short lengths coupled together and inclosed within the said tube C, substantially as described.

3. The combination of the metallic tube C, formed in lengths having a tapered exterior at one end and a correspondingly-tapered interior at the other end, whereby they are connected together by a slip-joint, and the insulating-tube D, inserted within the tube C, and likewise formed in lengths having a tapered exterior at one end and a correspondingly-tapered interior at the other end, whereby the said lengths are connected together by a slip-joint, substantially as described.

4. The device for permitting access to electric conducting-wires within the man-hole, consisting of the combination of the following elements, viz: the insulating-tubes D, disconnected from each other, but projecting beyond the metal tubes C, as shown at $d'$, a sleeve, E, of insulating material, fitting over the projecting ends of the tube D, and thus connecting the same, a metallic sleeve, F, divided into two parts longitudinally, and fitting over the ends of the tube C, thus connecting the same, and means for detachably holding the two parts of the sleeve F together, substantially as described.

HENRY B. COBB.

In presence of—
 JOSEPH WAHL,
 WM. H. DYRENFORTH.